(12) United States Patent
Tseng et al.

(10) Patent No.: US 7,817,239 B2
(45) Date of Patent: Oct. 19, 2010

(54) LIQUID CRYSTAL DISPLAY PANEL AND MANUFACTURING METHOD THEREOF

(75) Inventors: Kuei-Sheng Tseng, Hsinchu (TW);
Tung-Chang Tsai, Hsinchu (TW);
Ming-Chang Shih, Hsinchu (TW);
Chao-Chin Wu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 241 days.

(21) Appl. No.: 12/037,939

(22) Filed: Feb. 27, 2008

(65) Prior Publication Data

US 2009/0115954 A1     May 7, 2009

(30) Foreign Application Priority Data

Nov. 7, 2007    (TW) .............................. 96142070 A

(51) Int. Cl.
*G02F 1/1339* (2006.01)
(52) U.S. Cl. ..................................... 349/157
(58) Field of Classification Search .................. 349/157
See application file for complete search history.

(56) References Cited

U.S. PATENT DOCUMENTS

| 6,067,144 | A | 5/2000 | Murouchi |
| 6,954,251 | B2 | 10/2005 | Nam et al. |
| 7,057,695 | B2 | 6/2006 | Mun et al. |
| 7,068,342 | B1 * | 6/2006 | Lee ............................. 349/155 |

| 2005/0157245 | A1 | 7/2005 | Lin et al. |
| 2005/0179853 | A1 | 8/2005 | Chen et al. |

FOREIGN PATENT DOCUMENTS

| CN | 1497299 | 5/2004 |
| KR | 1020070059255 | 6/2007 |
| TW | 573190 | 1/2004 |
| TW | I257500 | 7/2006 |
| TW | I258619 | 7/2006 |

OTHER PUBLICATIONS

"2ND Office Action of China counterpart application", issued on May 22, 2009, p. 1-p. 6.

* cited by examiner

*Primary Examiner*—Jerry T Rahll
(74) *Attorney, Agent, or Firm*—Jianq Chyun IP Office

(57) ABSTRACT

An LCD panel including a first substrate, a second substrate, a black matrix, a liquid crystal (LC) layer, first photo spacers and second photo spacers is provided. The first and the second substrates are substantially parallel. The LC layer is disposed between the first and the second substrates. The black matrix disposed on the first substrate surrounds display regions and defines a non-display region. The first photo spacers contact the second substrate and are disposed on the black matrix. The second photo spacers are disposed on the black matrix. Channels are formed between the second photo spacers, such that LC molecules of the LC layer flow between the display regions through the channels. The width of the channels between any two of the adjacent second photo spacers substantially ranges from 2~10 μm. The dimension of the first photo spacers is substantially greater than that of the second photo spacers.

20 Claims, 14 Drawing Sheets

LIQUID CRYSTAL DISPLAY PANEL AND MANUFACTURING METHOD THEREOF

CROSS-REFERENCE TO RELATED APPLICATION

This application claims the priority benefit of Taiwan application serial no. 96142070, filed on Nov. 7, 2007. The entirety of the above-mentioned patent application is hereby incorporated by reference herein and made a part of this specification.

BACKGROUND OF THE INVENTION

1. Field of the Invention

The present invention relates to a liquid crystal display (LCD) panel, and more particularly to an LCD panel in which photo spacers having different heights are disposed.

2. Description of Related Art

Recently, thin film transistor liquid crystal displays (TFT-LCDs) equipped with superior properties such as high definition, favorable space utilization, low power consumption and non-radiation have become mainstream display products in the market. An LCD panel applied to the TFT-LCD is usually constituted by a TFT array substrate, a color filter substrate, and a liquid crystal (LC) layer disposed between said two substrates.

FIG. 1A is a top view schematically illustrating a portion of a conventional LCD panel, and FIG. 1B is a cross-sectional view illustrating the portion of the LCD panel depicted in FIG. 1A along a sectional line AA'. Referring to FIGS. 1A and 1B, an LCD panel 100 includes a first substrate 10, a second substrate 20, a black matrix 12, a color filter film 16, an LC layer 30, and a plurality of spacers 14. The LC layer 30 is disposed between the first substrate 10 and the second substrate 20. The black matrix 12 and the color filter film 16 are formed on the first substrate 10. The black matrix 12 surrounds a plurality of openings to define a plurality of display regions P1. The color filter film 16 is disposed in the display regions P1, while the black matrix 12 defines a non-display region P2. Besides, the spacers 14 are disposed between the first substrate 10 and the second substrate 20 to maintain the distance therebetween. In general, as the LCD panel 100 performs a displaying function, light leakage may occur around the spacers 14, and thus the spacers 14 are usually disposed in the non-display region P2.

Images can merely be displayed in the display region P1 when the LCD panel 100 performs the displaying function. Hence, liquid crystal (LC) molecules located in the non-display region P2 barely contribute to displaying the images. Moreover, the LC molecules in the non-display region P2 may result in a waste on the use of the LC materials and manufacturing costs of the LCD panel.

SUMMARY OF THE INVENTION

The present invention is directed to an LCD panel by which the use of LC materials is reduced.

The present invention is further directed to a method for manufacturing an LCD panel. In the method, photo spacers with different heights are formed, such that manufacturing costs of the LCD panel equipped with said photo spacers are reduced.

The present invention is further directed to an electro-optical device with relatively low manufacturing costs.

The present invention is further directed to a method for manufacturing an electro-optical device. In the method, an amount of required LC molecules is minimized while the manufacturing complexity of the electro-optical device remains unchanged, which is conducive to lowering the manufacturing costs.

The present invention provides an LCD panel including a first substrate, a second substrate, a black matrix, an LC layer, a plurality of first photo spacers, and a plurality of second photo spacers. The first substrate is substantially paralleled with the second substrate, and the LC layer is disposed between the first substrate and the second substrate. The black matrix disposed on the first substrate surrounds a plurality of display regions while the black matrix defines a non-display region. The first photo spacers are disposed on the black matrix and contact the second substrate. By contrast, the second photo spacers are disposed on the black matrix. A plurality of channels is formed between the second photo spacers, such that LC molecules of the LC layer flow between the display regions through the channels. The width of the channels between any two of the adjacent second photo spacers substantially ranges from 2 µm to 10 µm, and the dimension of the first photo spacers is substantially greater than the dimension of the second photo spacers.

According to an embodiment of the present invention, the length of the second photo spacers in an extending direction of each of the channels substantially ranges from 2 µm to 19 µm.

According to an embodiment of the present invention, the width of the second photo spacers between any two of the adjacent channels substantially ranges from 2 µm to 19 µm.

According to an embodiment of the present invention, the length of the second photo spacers in an extending direction of each of the channels is substantially 7 µm.

According to an embodiment of the present invention, the width of the second photo spacers between any two of the adjacent channels is substantially 2 µm.

According to an embodiment of the present invention, a shape of each of the first photo spacers projected on the first substrate is a substantially rectangular shape. Here, the width of the substantially rectangular shapes substantially ranges from 8 µm to 24 µm, and the length of the substantially rectangular shapes substantially ranges from 8 µm to 24 µm as well. Specifically, the width of the substantially rectangular shapes substantially ranges from 8 µm to 16 µm, for example, and the length of the substantially rectangular shapes substantially ranges from 17 µm to 24 µm, for example.

According to an embodiment of the present invention, a difference between the height of the first photo spacers and the height of the second photo spacers is substantially greater than 0 µm but substantially less than or substantially equal to 3 µm.

According to an embodiment of the present invention, the LCD panel further includes an active layer disposed on the second substrate. The active layer includes a plurality of TFTs, a plurality of scan lines disposed in the non-display region, and a plurality of data lines disposed in the non-display region. The scan lines interlace with the data lines, and the TFTs are electrically connected to the corresponding scan lines and data lines.

According to an embodiment of the present invention, the LCD panel further includes a plurality of color filter films disposed on the first substrate and located in the display regions.

The present invention further provides a method of manufacturing an LCD panel. The method includes providing a first substrate on which a black matrix surrounding a plurality of display regions is disposed. The black matrix defines a non-display region. Next, a photoresist material layer is formed on the first substrate. Thereafter, a patterning process is performed to pattern the photoresist material layer, such that a plurality of first photo spacers and a plurality of second photo spacers are formed on the black matrix. The dimension of the first photo spacers is substantially greater than the dimension of the second photo spacers. A plurality of channels is formed between the second photo spacers, and the width of the channels between any two of the adjacent second photo spacers substantially ranges from 2 μm to 10 μm. After that, a second substrate is provided. An LC layer is then formed between the first substrate and the second substrate. LC molecules of the LC layer flow between the channels, and the first photo spacers contact the second substrate.

According to another embodiment of the present invention, the method of the LCD panel further includes forming a plurality of color filter films on the first substrate and in the display regions.

According to another embodiment of the present invention, the method of the LCD panel further includes forming an active layer on the second substrate. The active layer includes a plurality of TFTs, a plurality of scan lines disposed in the non-display region, and a plurality of data lines disposed in the non-display region. The scan lines interlace with the data lines, and the TFTs are electrically connected to the corresponding scan lines and data lines.

According to another embodiment of the present invention, a semi-transparent photomask is utilized for performing the patterning process.

According to another embodiment of the present invention, the formation of the LC layer includes a vacuum suction method.

According to another embodiment of the present invention, the formation of the LC layer includes a one drop filling (ODF) method.

The present invention further provides an electro-optical device including the LCD panel as provided in the above embodiments.

The present invention further provides a method of manufacturing an electro-optical device, and the manufacturing method includes the method of manufacturing the LCD panel as described in the above embodiments.

In light of the foregoing, the plurality of the second photo spacers is disposed in the non-display region of the LCD panel. The second photo spacers are disposed in a space which is originally occupied by the LC molecules, thus reducing the amount of the required LC molecules. Moreover, in comparison with one embodiment of the present invention, the semi-transparent photomask is used in the method of manufacturing the LCD panel according to another embodiment. Thereby, the first photo spacers and the second photo spacers having different dimensions are formed simultaneously. Hence, the present invention is not only able to minimize the amount of the required LC materials, but also capable of reducing the manufacturing time and simplifying the manufacturing process of the photo spaces with different dimensions. As such, the manufacturing costs of the LCD panel are decreased, and the manufacturing process of the LCD panel is simplified as well.

In order to make the aforementioned and other objects, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
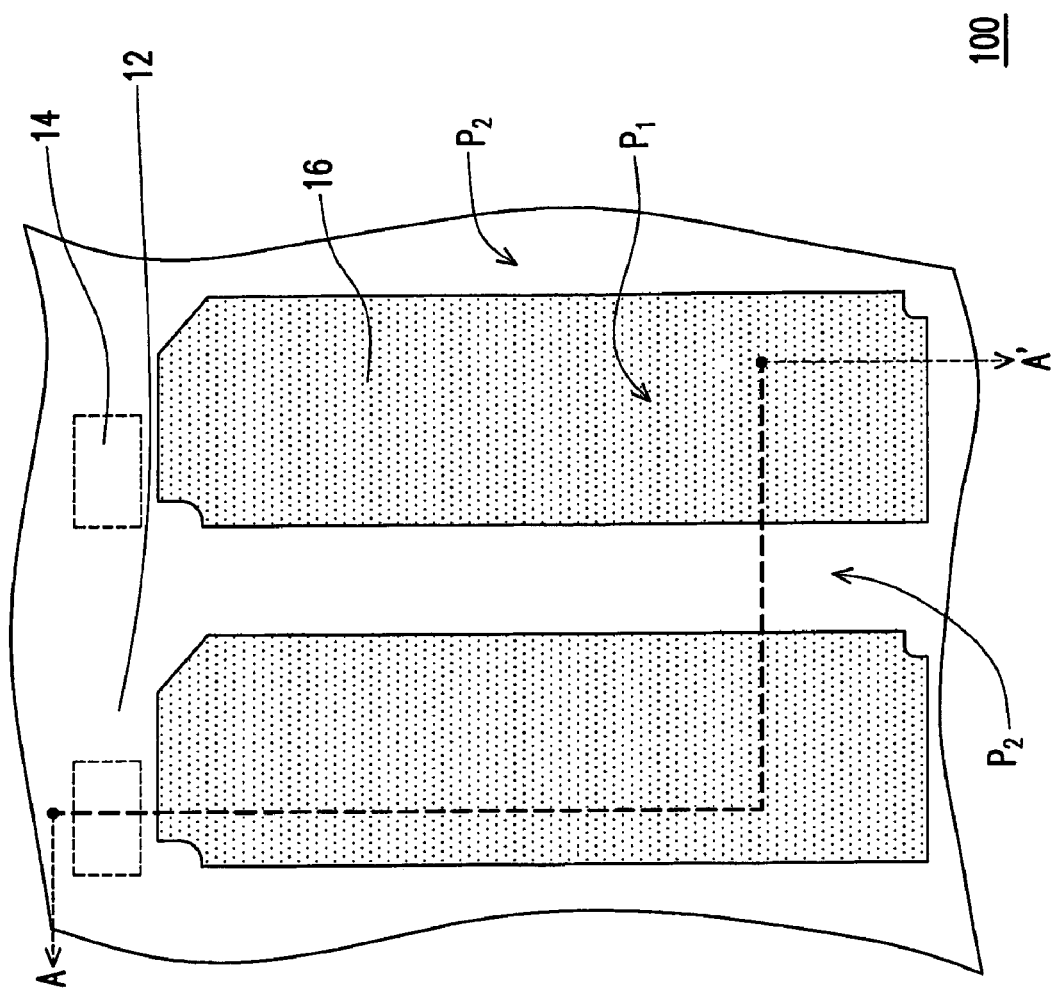
FIG. 1A is a top view schematically illustrating a portion of a conventional LCD panel.
Figure 1B:
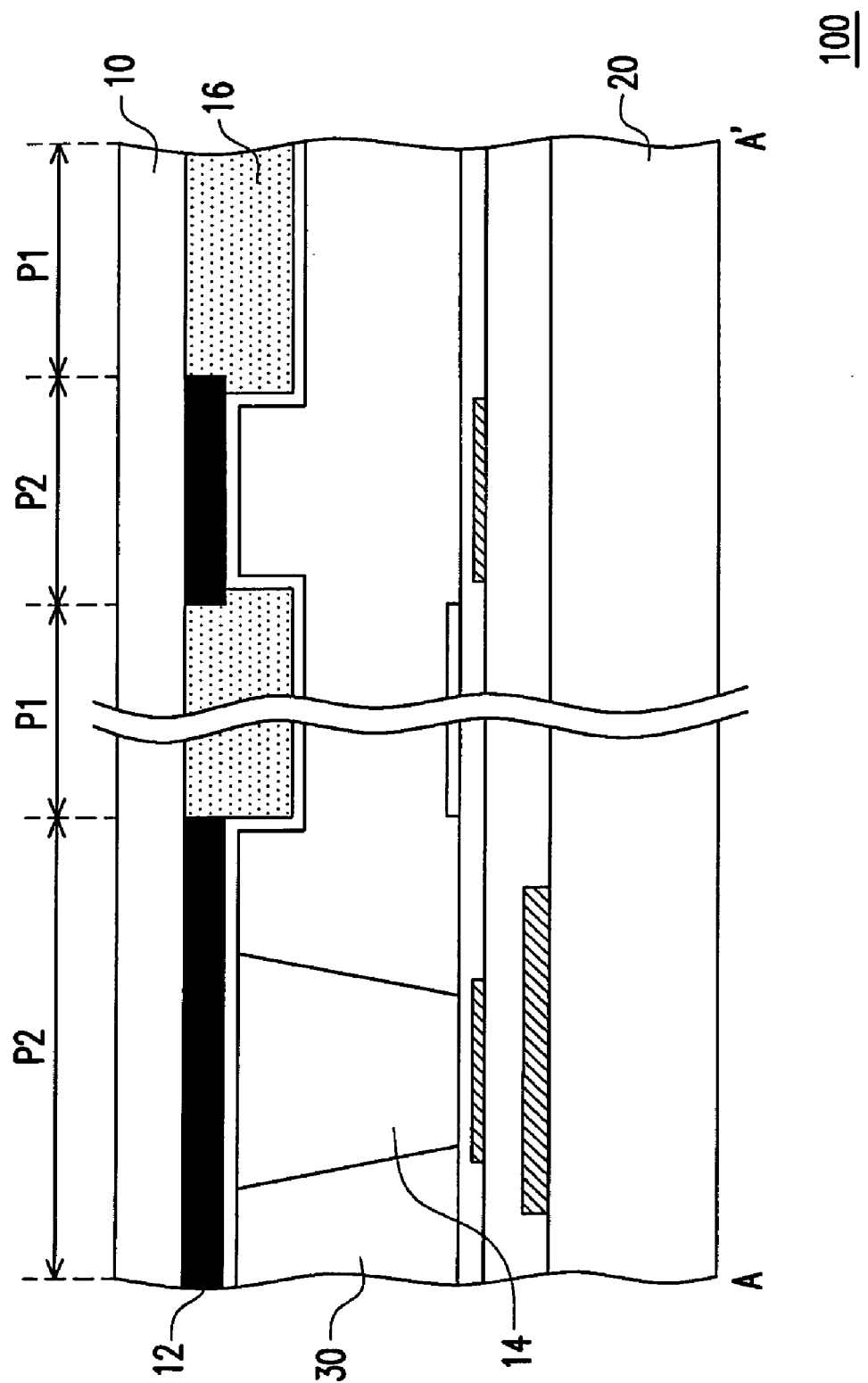
FIG. 1B is a cross-sectional view illustrating the portion of the LCD panel depicted in FIG. 1A along a sectional line AA'.
Figure 2A:
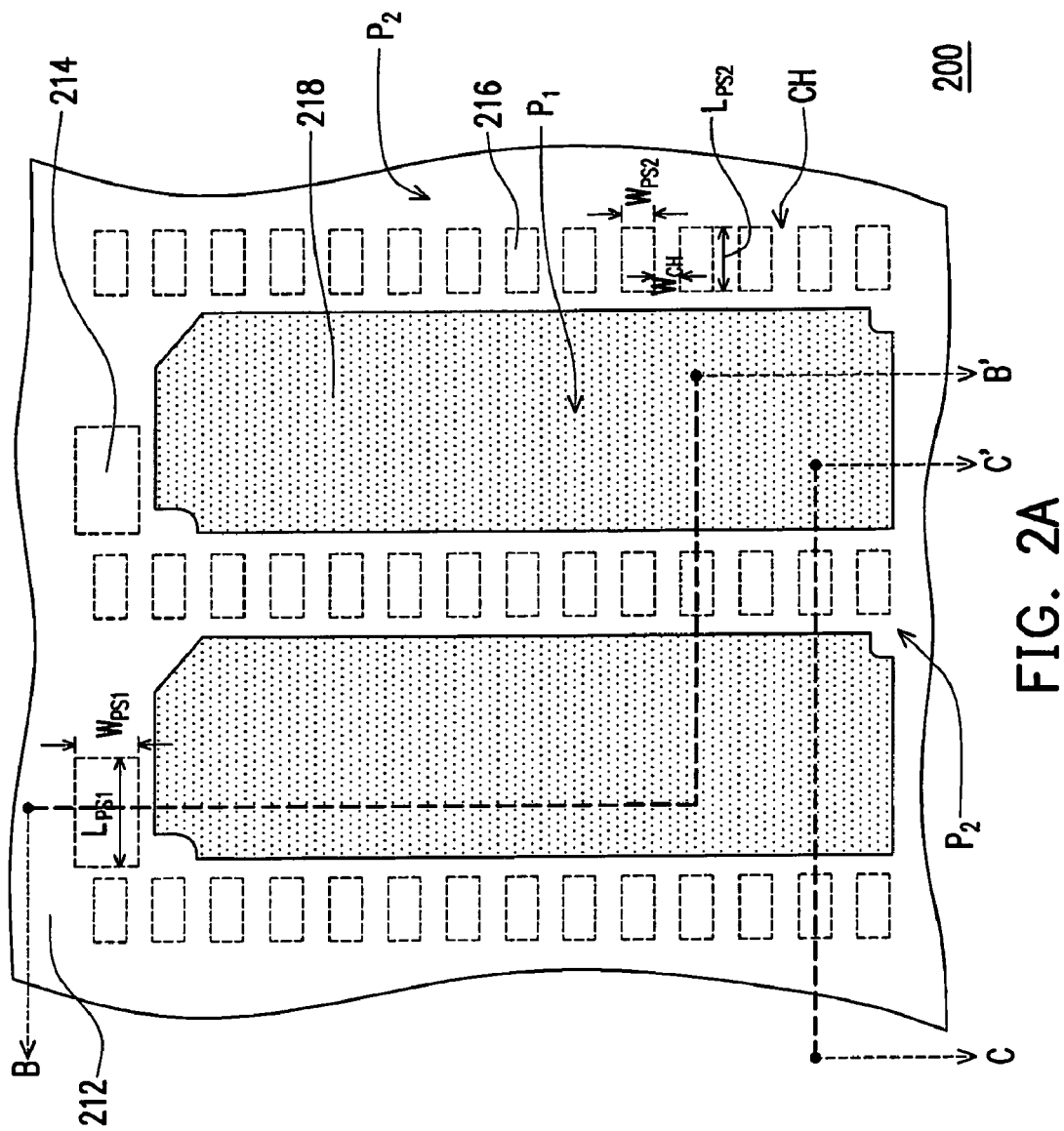
FIG. 2A is a top view schematically illustrating a portion of an LCD panel of the present invention.
Figure 2B:
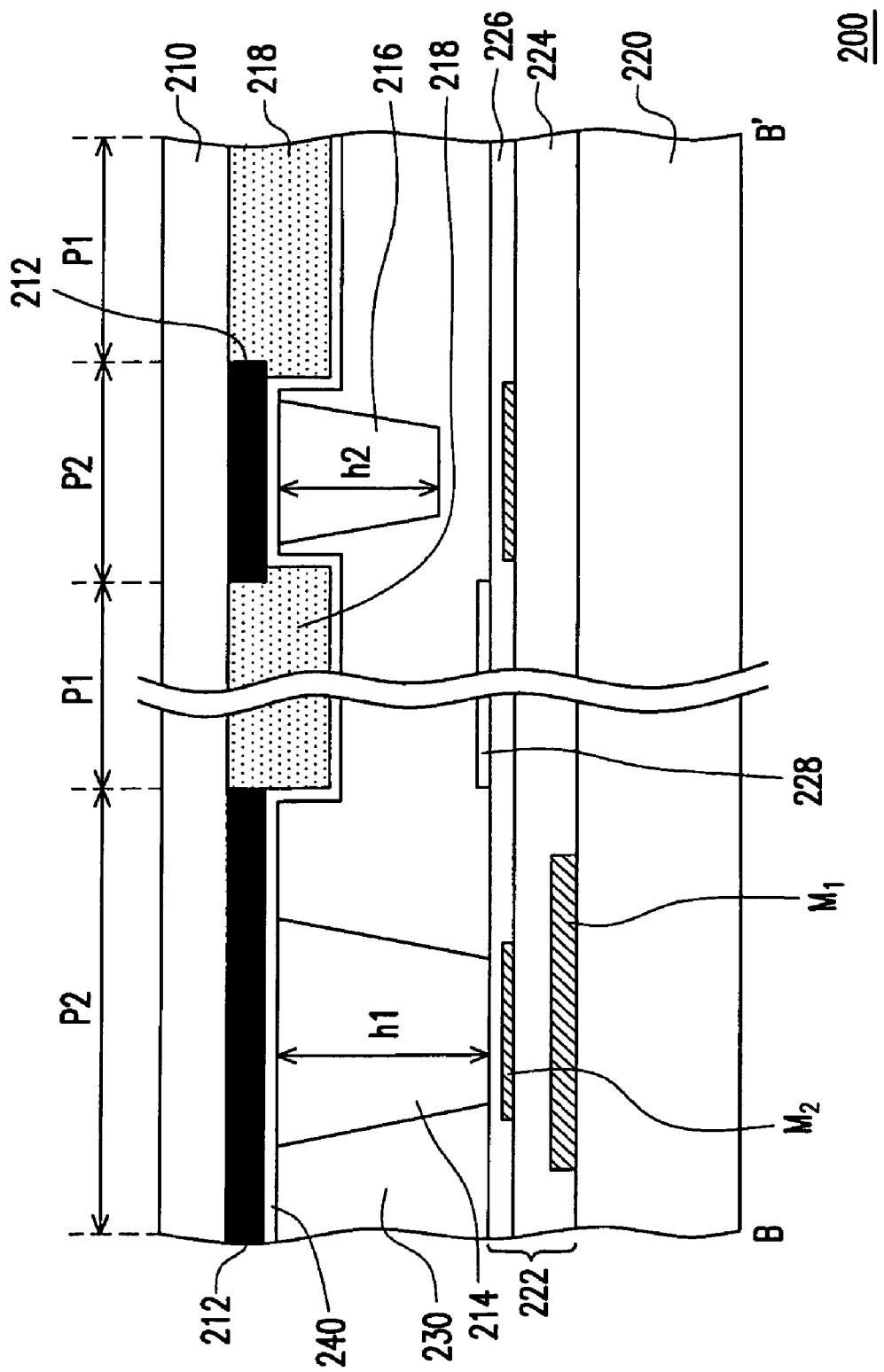
FIG. 2B is a cross-sectional view illustrating the portion of the LCD panel depicted in FIG. 2A along a sectional line BB'.

FIG. 2A is a top view schematically illustrating a portion of an LCD panel of the present invention, and FIG. 2B is a cross-sectional view illustrating the portion of the LCD panel depicted in FIG. 2A along a sectional line BB'. As shown in FIGS. 2A and 2B, an LCD panel 200 includes a first substrate 210, a second substrate 220, a black matrix 212, an LC layer 230, a plurality of first photo spacers 214, and a plurality of second photo spacers 216. The first substrate 210 is substantially parallel to the second substrate 220, and the LC layer 230 is disposed between the first substrate 210 and the second substrate 220. The black matrix 212 disposed on the first substrate 210 surrounds a plurality of display regions P1 while the black matrix 212 defines a non-display region P2. In addition, the display regions P1 and the non-display region P2 are defined as a pixel region (not shown), and the LCD panel 200 has a plurality of pixel regions and a peripheral circuit region surrounding with the pixel regions.

The first photo spacers 214 and the second photo spacers 216 are disposed on the black matrix 212. The first photo spacers 214 contact the second substrate 220 are adapted to maintain the distance between the first substrate 210 and the second substrate 220. A plurality of channels CH is formed between any two of the adjacent second photo spacers 216, such that LC molecules of the LC layer 230 flow between the display regions P1 through the channels CH. Preferably, the channels CH are formed between any two of the adjacent second photo spacers 216. The width $W_{CH}$ of the channels CH between any two of the adjacent second photo spacers 216 preferably substantial ranges from 2 μm to 10 μm, which is not limited in the present invention. Specifically, the dimension of the first photo spacers 214 is substantially greater than the dimension of the second photo spacers 216. Additionally, the second photo spacers 216 surround the portion of the display regions P1, for example, the second photo spacers 216 are disposed between the pixel regions and peripheral circuit region and/or the second photo spacers 216 are disposed between any two of the adjacent display regions P1, preferably, the second photo spacers 216 are disposed between any two of the adjacent display regions P1. In other words, the second photo spacers 216 are disposed between any two of the adjacent pixel regions.

In addition, the LCD panel 200 further includes other elements. For example, a plurality of color filter films 218 is formed on the first substrate 210 and in the display regions P1. The color filter films 218 are, for example, red, green, and blue. Besides, an active layer 222 is formed on the second substrate 220. The active layer 222 includes a plurality of scan lines disposed in the non-display region P2, a plurality of data lines disposed in the non-display region P2, and a plurality of TFTs disposed in the non-display region P2. In an alternative, the active layer 222 includes the scan lines and the data lines both disposed in the non-display region P2, and the TFTs are disposed in the display regions P1. The scan lines, the data lines, and the TFTs are at least constituted by a plurality of conductive layers M1 and M2. The scan lines interlace with the data lines. The TFTs are electrically connected to the corresponding scan lines and data lines. The active layer 222 further includes a plurality of dielectric layers 224 and 226 disposed between the conductive layer M1 (also referring to as a first conductive layer) and the conductive layer M2 (also referring to as a second conductive layer). The dielectric layers 224 and 226 cover the conductive layers M1 and M2. Here, the dielectric layers are, for example, gate insulating layers between the conductive layers M1 and M2, interlayer dielectric layers, and passivation layers and/or planar layers covering the conductive layer M2. Moreover, a plurality of pixel electrodes 228 is disposed on the dielectric layer 226, located in the display regions P1, and electrically connected to the corresponding TFTs according to the present embodiment, which is otherwise not limited in the present invention. The plurality of the pixel electrodes 228 can also be selectively disposed on the second substrate 220, located in the display regions P1, and electrically connected to the corresponding TFTs. Further, the pixel electrodes 228 can also be disposed on the dielectric layer 224, located in the display regions P1, and electrically connected to the corresponding TFTs. A common electrode 240 is further disposed on the first substrate 210.

In the LCD panel 200, the regions on which the conductive layers M1 and M2 are disposed are not able to achieve satisfactory display performance, and thus the black matrix 212 with the light-shielding function should be disposed on the regions for enhancing the display effect. Accordingly, the black matrix 212 defines the non-display region P2, and light in the non-display region P2 is not exposed to a user. As such, the LC molecules in the non-display region P2 do not contribute to an improvement of the display performance, resulting in a waste on manufacturing costs of the LCD panel.

According to the present invention, however, the second photo spacers 216 disposed between the first substrate 210 and the second substrate 220 are arranged in the non-display region P2, so as to occupy a space in which the LC molecules are positioned. Hence, the disposition of the second photo spacers 216 is conducive to a reduction of the required LC molecules of the LCD panel 200. As the dimension of the second photo spacers 216 is relatively great and the distribution density of the second photo spacers 216 is comparatively high, less LC molecules of the LCD panel 200 are required. Nevertheless, in consideration of the entire manufacturing process of the LCD panel 200, favorable mobility of the LC molecules of the LCD panel 200 between the display regions P1 should be guaranteed. As a result, the dimension and the distribution density of the second photo spacers 216 ought to be set within a proper range.

In particular, at least one of the following manufacturing conditions is satisfied in the embodiments of the present invention. For example, preferably, the length $L_{PS2}$ of the second photo spacers 216 in an extending direction of each of the channels CH substantially ranges from 2 μm to 19 μm, while the width $W_{PS2}$ of the second photo spacers 216 between any two of the adjacent channels CH substantially ranges from 2 μm to 19 μm as well. In other words, when a shape of each of the second photo spacers 216 projected on the first substrate 210 is a substantially rectangular shape, in which a side length of the substantially rectangular shape substantially ranges from 2 μm to 19 μm. On the other hand, to guarantee favorable mobility of the LC molecules between each of the display regions P1, a space may exist between the second photo spacers 216 and the second substrate 220. Namely, the second photo spacers 216 are not in contact with the second substrate 220. In practice, a difference between the height h1 of the first photo spacers 214 and the height h2 of the second photo spacers 216 is preferably substantial greater than 0 μm but substantially less than or substantially equal to 3 μm, which is not limited in the present invention.

Besides, the dimension of the first photo spacers 214 varies upon different designs of the LCD panel 200. As the shape of each of the first photo spacers 214 projected on the first substrate 210 is the substantially rectangular shape, the width $W_{PS1}$ of the substantially rectangular shape preferably substantial ranges from 8 μm to 24 μm, while the length $L_{PS1}$ of the substantially rectangular shape also preferably substantial ranges from 8 μm to 24 μm. Alternatively, in other embodiments, the width $W_{PS1}$ of the first photo spacers 214 shaped as the substantially rectangular shapes on the first substrate 210 may also substantially ranges from 8 μm to 16 μm, while the length $L_{PS1}$ thereof substantially ranges from 17 μm to 24 μm.

Specifically, the dimensions of the first photo spacers 214, the second photo spacers 216, and the channels CH can be changed along with the dimension of the LCD panel 200. A 19-inch LCD panel 200 is taken for an example, in which the width $W_{CH}$ of the channels CH between any two of the adjacent second photo spacers 216 is preferably substantial 2 μm, while said dimension is not limited in the present invention. The length $L_{PS2}$ of the second photo spacers 216 in the extending direction of each of the channels CH is substantially 7 μm, for example, while the width $W_{PS2}$ of the second photo spacers 216 between any two of the adjacent channels CH is preferably substantial 2 μm. Likewise, said dimensions are not limited in the present invention. On the above-described conditions, an area of the rectangular first photo spacers 214 which are projected on the first substrate 210 is substantially equal to 14 μm×16 μm. Note that the dimensions discussed above are merely exemplary and do not serve as limitations to the present invention. According to other embodiments, the first photo spacers 214, the second photo spacers 216, and the channels CH in the 19-inch LCD panel 200 or in the LCD panels having other dimensions can also have different dimensions.

Figure 2C:
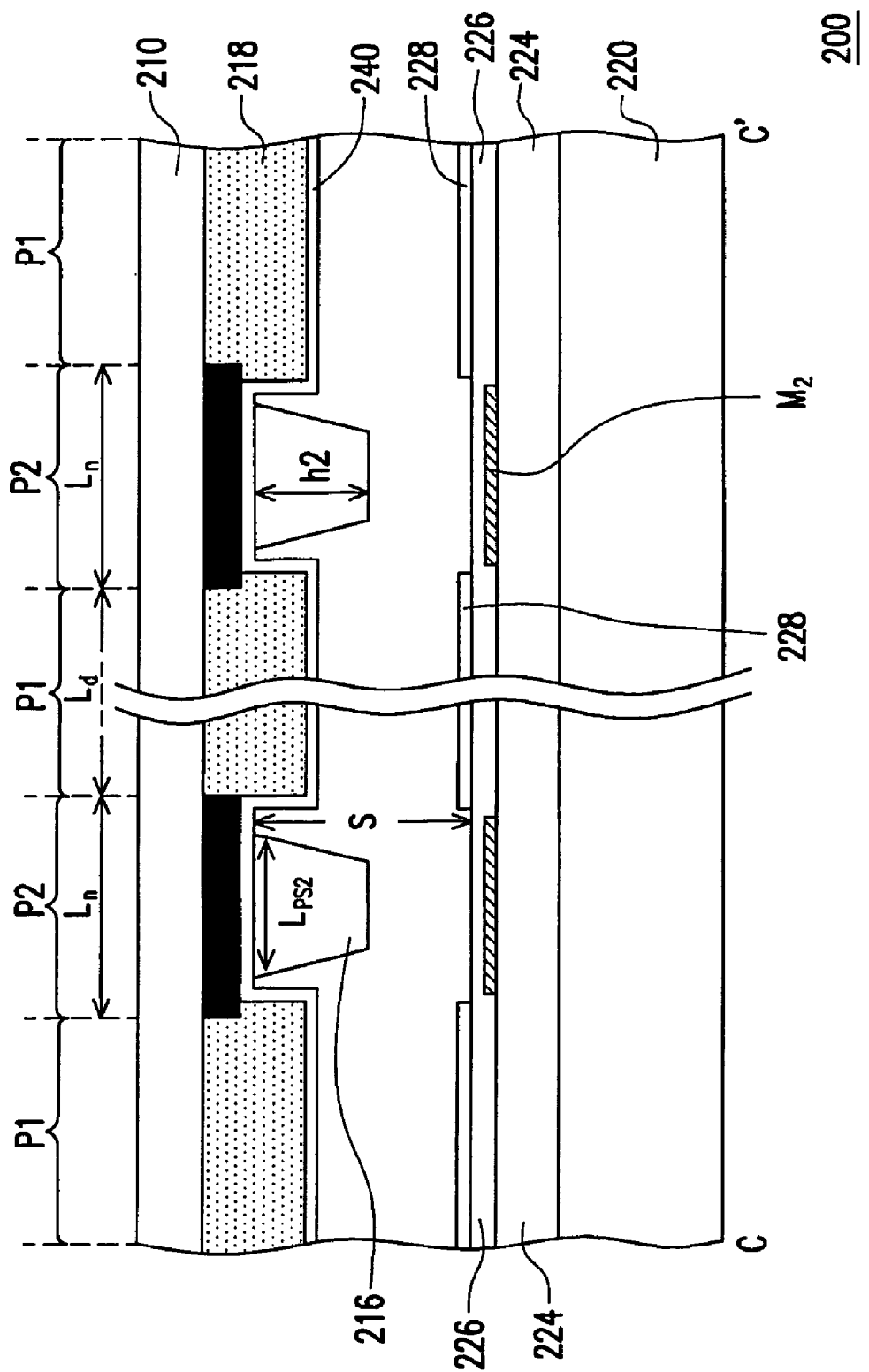
FIG. 2C is a cross-sectional view illustrating the portion of the LCD panel depicted in FIG. 2A along a sectional line CC'.

FIG. 2C is a cross-sectional view illustrating the portion of the LCD panel depicted in FIG. 2A along a sectional line CC'. As indicated in FIG. 2C, it is assumed that the length $L_n$ of the non-display region P2 is substantially 27 μm, while the length $L_d$ of each of the display regions P1 is substantially 67.5 μm. At this time, if the length $L_{PS2}$ of the second photo spacers 216 disposed in the non-display region P2 is substantially 19 μm, a ratio of the length $L_{PS2}$ of the second photo spacers 216 to the length of the entire cross-section is substantially equal to 19/(27+67.5)=0.201=20%. It is further assumed that a cell gap of the non-display region P2 is S and the height h2 of the second photo spacers 216 is substantially equal to S/2. As such, a ratio of the cross-sectional area of the second photo spacers 216 to the area of the entire cross-section is substantially equal to 20%×50%=10%. Hence, as illustrated in the cross-sectional view of FIG. 2C, the disposition of the second photo spacers 216 substantially results in a 10% reduction of the required amount of the LC molecules.

Based on the above, given that 2 US dollars are required by the LC materials for manufacturing one conventional LCD panel 100, 0.2 US dollars, i.e. 6.6 NTD (the exchange rate for USD/NTD=1/33), can be saved by manufacturing one of the LCD panels 200 provided in the present embodiment. Suppose that one million finished LCD panels 200 are manufactured per month, 6.6×1,000,000=6,600,000 NTD can be saved by manufacturing the LCD panels 200 per month according to the present embodiment in comparison with manufacturing the same number of the conventional LCD panels 100. In view of the foregoing, the design of the LCD panel 200 of the present invention is capable of effectively reducing the manufacturing costs.

Figure 2D:
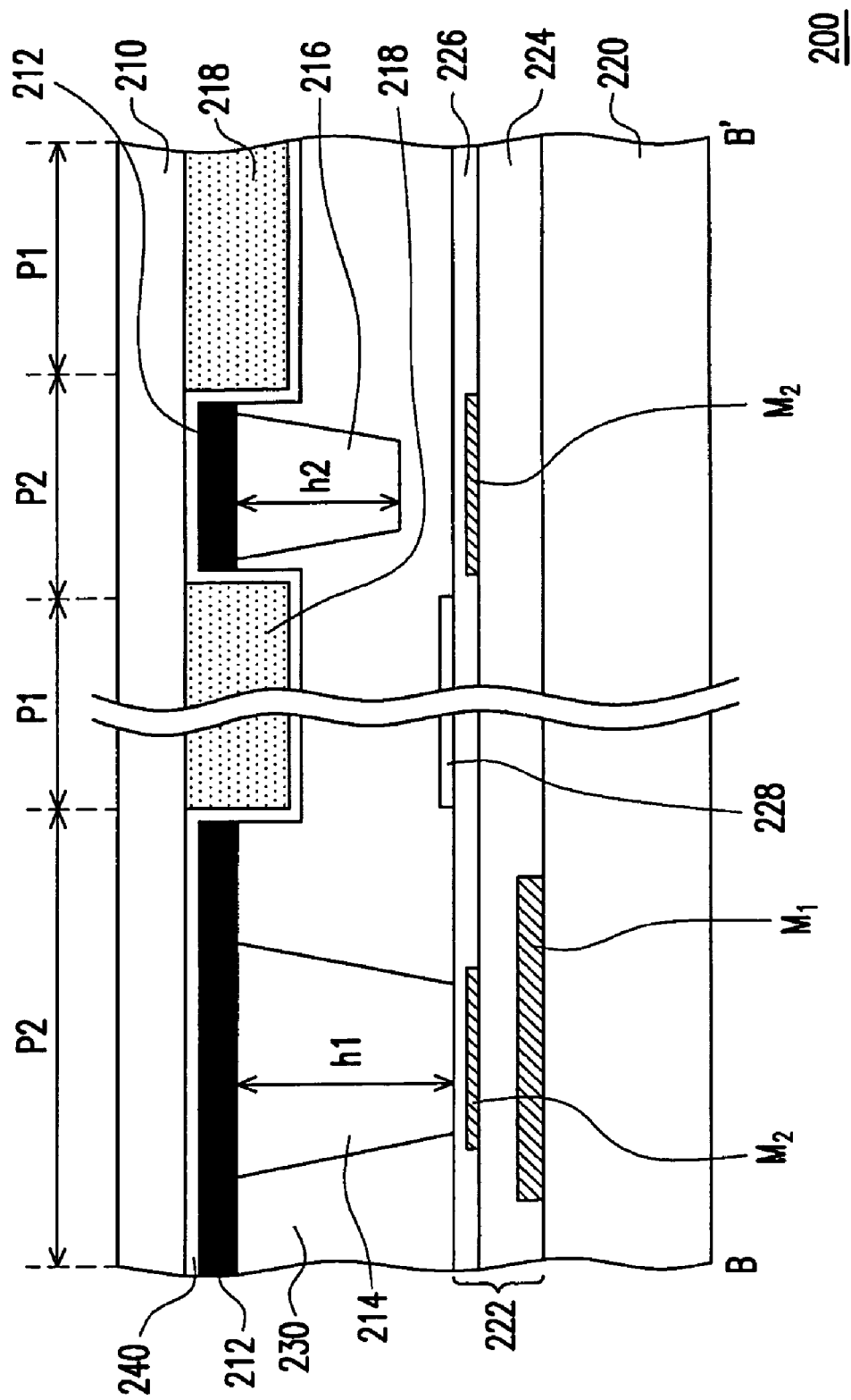
FIGS. 2D through 2F are cross-sectional views illustrating three different first substrates disposed in the LCD panel depicted in FIG. 2A.
Figure 2E:
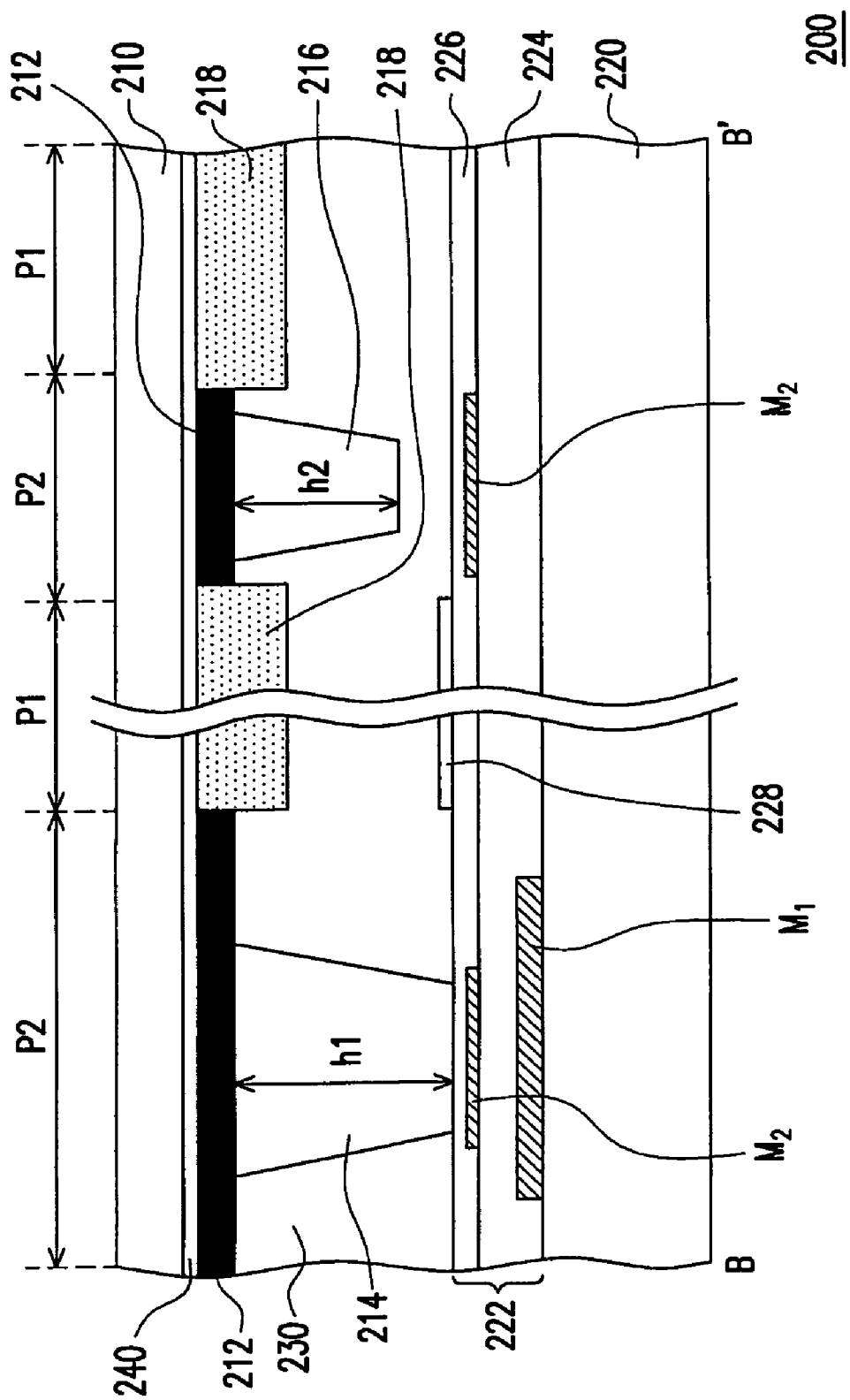
Figure 2F:
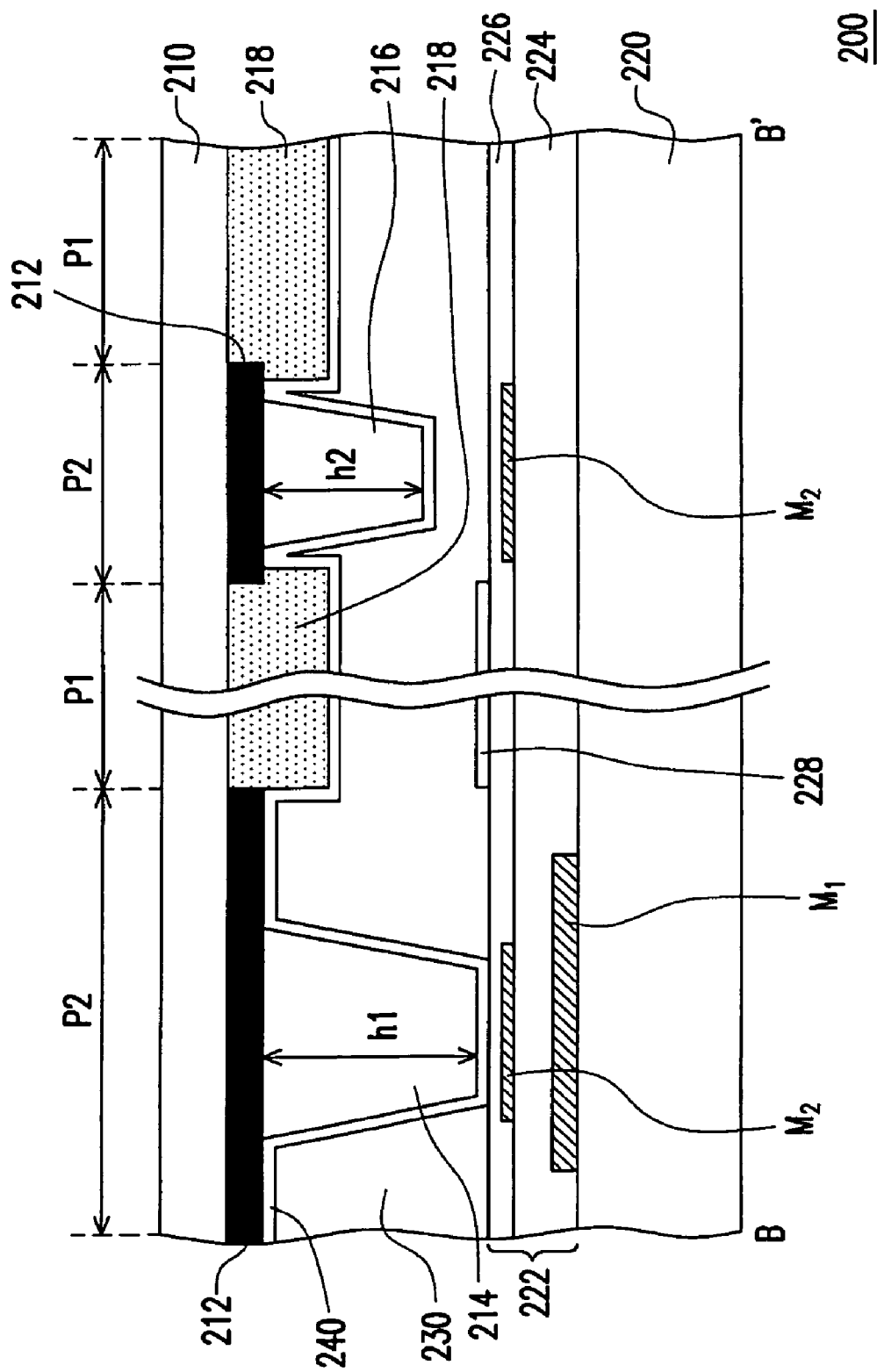

It is certain that the structure of the LCD panel 200 of the present invention is not limited to the structure described in the previous embodiment. For example, the common electrode 240 in the LCD panel 200 may be disposed in various manners. FIGS. 2D through 2F are cross-sectional views illustrating three different first substrates disposed in the LCD panel depicted in FIG. 2A. Referring to FIG. 2D, the common electrode 240 of the LCD panel 200 covers the color filter films 218 and the first substrate 210, while the black matrix 218 is formed on the common electrode 240. Besides, the first photo spacers 214 and the second photo spacers 216 are formed on the black matrix 212. It should be noted that materials of the black matrix 212, the first photo spacers 214, and the second photo spacers 216 may be substantially identical or substantially different. The black matrix 212, the first photo spacers 214, and the second photo spacers 216 are integrally formed (not shown) when the materials of the first photo spacers 214 and the second photo spacers 216 are substantially identical. That is to say, during the formation of the LCD panel 200, only one exposure and development process is actually required. Namely, bottom portions of the first photo spacers 214 and the second photo spacers 216 are disposed at a location where the black matrix 212 is originally positioned. Thereby, the method of manufacturing the LCD panel 200 is able to simplify the manufacturing process and reduce the manufacturing costs. Undoubtedly, said integrally formed structure comprising the black matrix 212, the first photo spacers 214, and the second photo spacers 216 is merely exemplary, which is not otherwise limited in the present invention.

Referring to FIG. 2E, the common electrode 240 of the LCD panel 200 may also be formed on the first substrate 210. The color filter films 218 and the black matrix 212 are respectively disposed on the common electrode 240. The first photo spacers 214 and the second photo spacers 216 are formed on the black matrix 212. In addition, as elaborated hereinbefore, the black matrix 212, the first photo spacers 214, and the second photo spacers 216 are integrally formed when made of the substantially identical materials. The structure illustrated in FIG. 2E resembles the structure depicted above, and thus no further description is provided hereinafter.

Referring to FIG. 2F, the common electrode 240 of the LCD panel 200 can not only be disposed on the first substrate 210 as discussed above, but also cover the black matrix 212, the color filter films 218, the first photo spacers 214, and the second photo spacers 216. In other words, the common electrode 240 is formed on the first substrate 210 after the fabrication of the black matrix 212, the color filter films 218, the first photo spacers 214, and the second photo spacers 216 is completed. Without doubt, the disposition of the common electrode 240 on the first substrate 210 merely serves as an embodiment of the present invention, which is not limited herein.

Figure 3A:
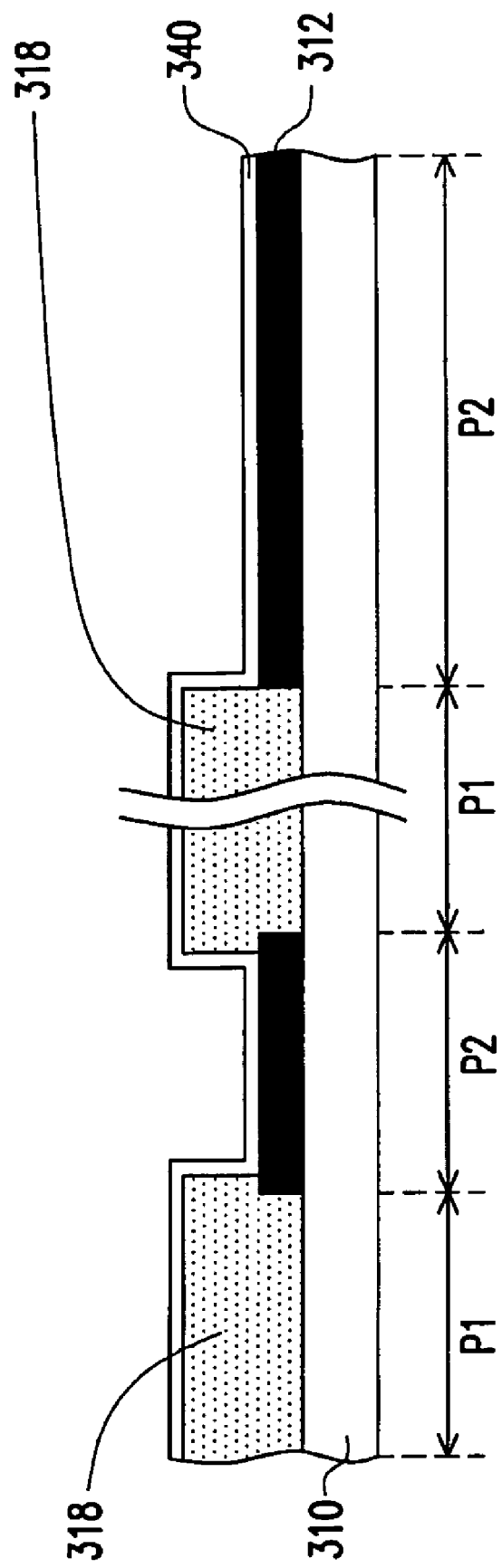
FIGS. 3A through 3C illustrate a method of manufacturing the first substrate of the LCD panel according to an embodiment of the present invention.
Figure 3B:
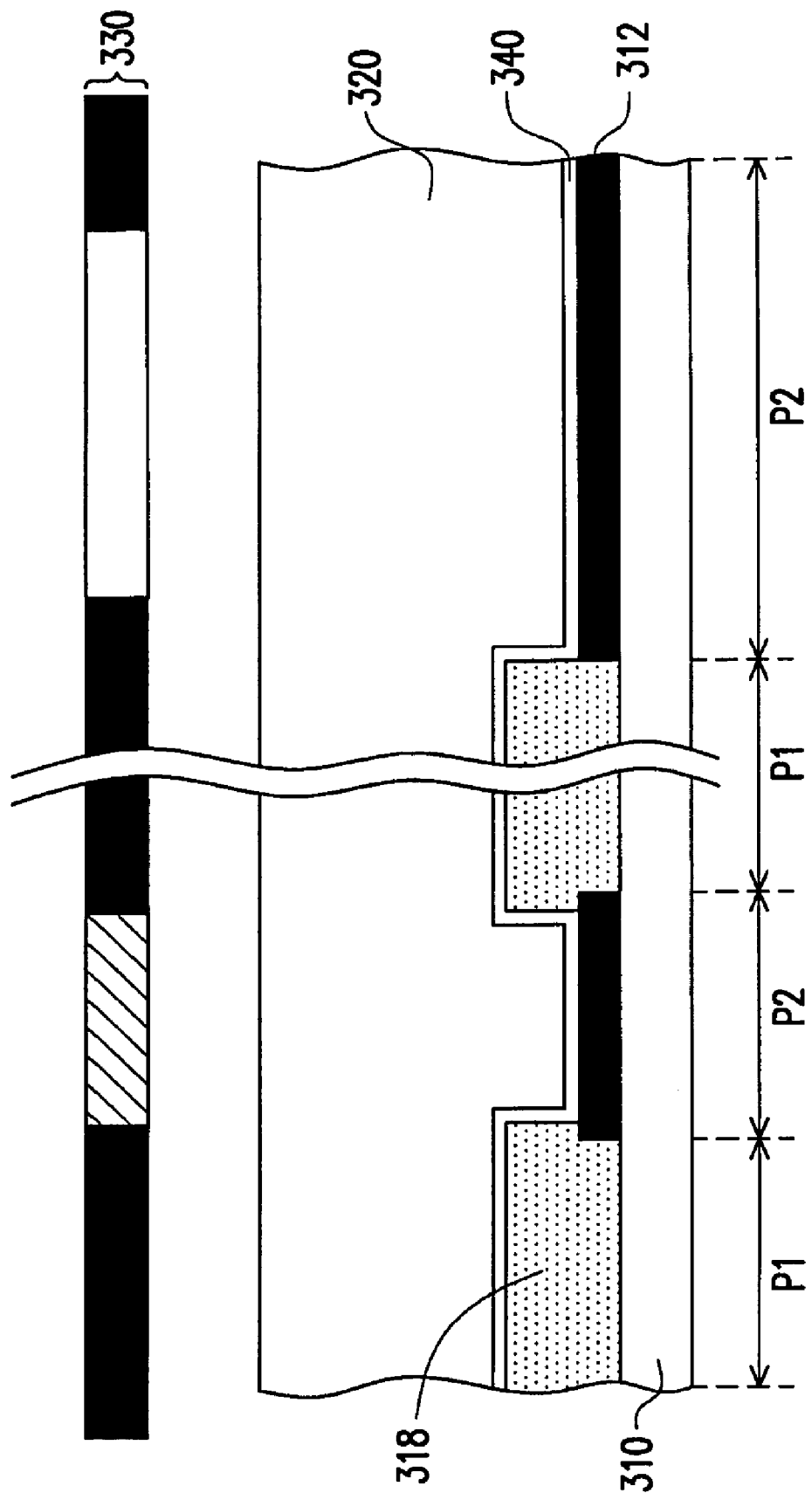
Figure 3C:
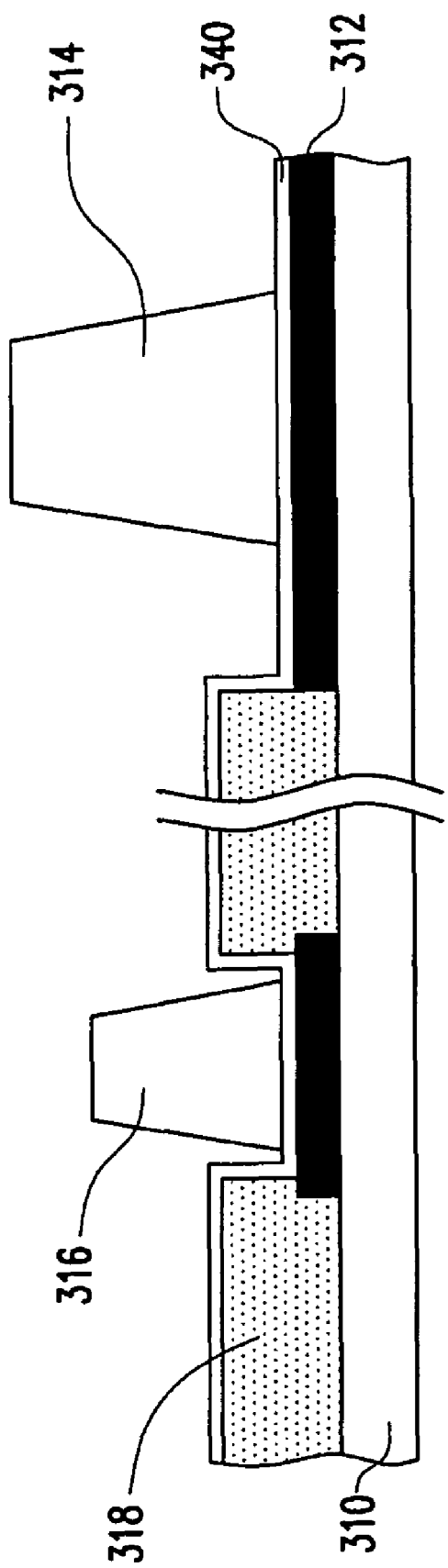

FIGS. 3A through 3C illustrate a method of manufacturing the first substrate of the LCD panel according to an embodiment of the present invention. As indicated in FIG. 3A, a first substrate 310 on which a black matrix 312, a color filter film 318, and a common electrode 340 are formed is provided at first. The black matrix 312 surrounds a plurality of the display regions P1. The color filter film 318 is disposed in the display regions P1, while the black matrix 312 defines the non-display region P2. Here, the display regions P1 and the non-display region P2 can also define the pixel region (not shown). The color filter film 318 is formed by performing a photolithography process, a printing process, an inkjet process, a coating process, and so forth, so as to form color filter materials in the display regions P1. Here, the color filter film 318 is, for example, red, green, blue, or of any other colors in a color coordinate. The common electrode 340 covers the color filter film 318 and the black matrix 312. Additionally, planar layers (not shown) may be further formed on the first substrate 310. Here, the planar layers are formed above the common electrode 340 and/or below the common electrode 340.

Next, as shown in FIGS. 3B and 3C, a photoresist material layer 320 is formed on the first substrate 310, and a patterning process is performed, so as to form a plurality of first photo spacers 314 and a plurality of second photo spacers 316. The photoresist material layer 320 is formed by implementing a spin-coating method, the inkjet method, or the printing method, for example, and a material of the photoresist material layer 320 is either a negative photoresist material or a positive photoresist material. In an alternative, a photo-sensitive material layer or an organic material layer can also be employed in the present embodiment of the invention. Moreover, a multi-level transparent mask, preferably, is adopted in the aforesaid patterning process, such as the semi-transparent mask, a gray-level mask, a slit mask, a diffraction mask, or any other masks. Besides, aside from the implementation of one exposure and development process in the present embodiment, a plurality of the exposure and development processes can be alternatively carried out with use of a normal mask having a transparent region and a non-transparent region. Here, the first photo spacers 314 and the second photo spacers 316 are disposed on the black matrix 312. In practice, the dimension of the first photo spacers 314 is substantially greater than the dimension of the second photo spacers 316.

The following description is provided by taking a semi-transparent mask 330 as one of the multi-level transparent masks for an example. The semi-transparent mask 330 has a plurality of regions with different transmittance, and thus energy set to various energy levels is respectively received by the photoresist material layer 320 corresponding to different regions. As such, the first photo spacers 314 and the second photo spacers 316 having different dimensions can be simultaneously formed by performing only one patterning process. On the other hand, it is likely to adjust the distribution of the first photo spacers 314 and the second photo spacers 316 by changing the distribution of the regions with different transmittance on the semi-transparent mask 330. Hence, the manufacturing process proposed by the present embodiment allows the second photo spacers 316 to have predetermined intervals therebetween. In other words, the dimensions and the distribution of the first photo spacers 314 and the second photo spacers 316 on the first substrate 310 of the present embodiment can be modified upon different design demands.

Figure 4A:
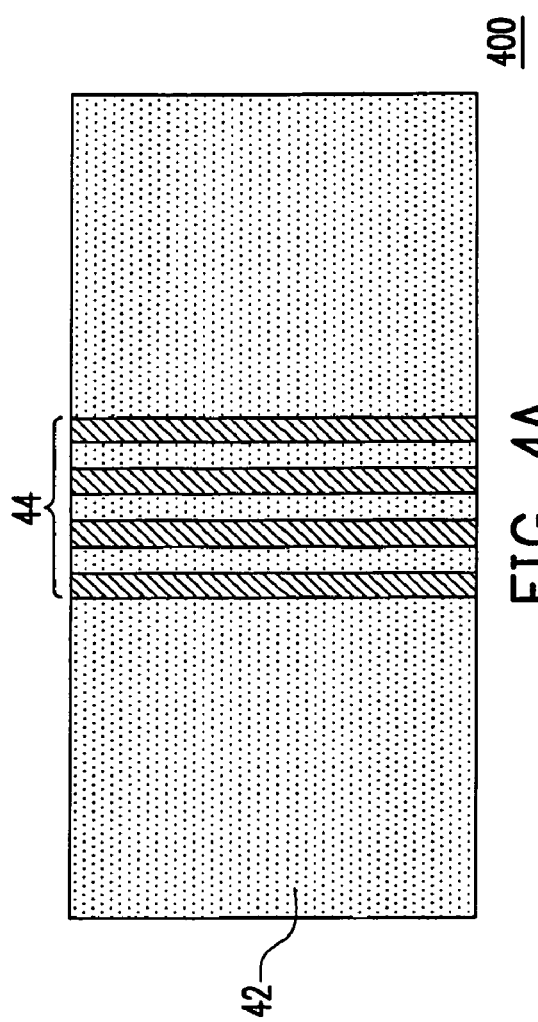
FIG. 4A is a schematic view of a semi-transparent photomask.
Figure 4B:
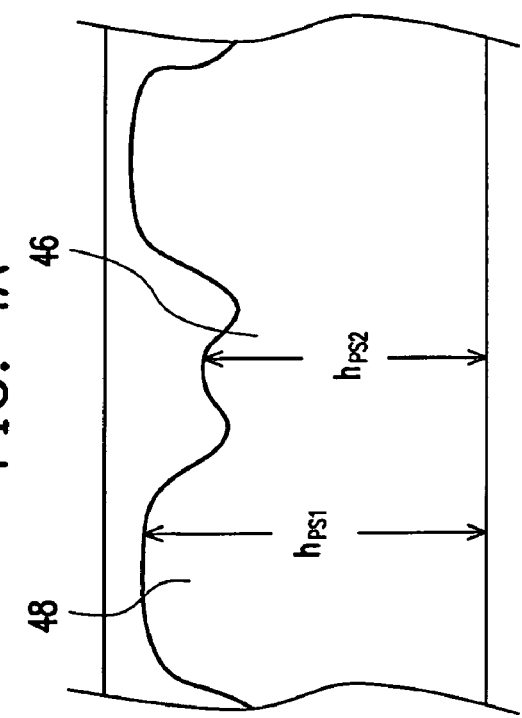
FIG. 4B illustrates photoresist patterns formed by performing a patterning process with use of the semi-transparent photomask depicted in FIG. 4A.

The implementation of the patterning process with use of the semi-transparent mask is exemplified hereinafter. FIG. 4A is a schematic view of a semi-transparent mask 400 having a transparent region 42, a semi-transparent region 44, and a non-transparent region (not shown). FIG. 4B illustrates photoresist patterns formed by performing a patterning process with use of the semi-transparent mask 400 depicted in FIG. 4A. Referring to FIGS. 4A and 4B, as the patterning process is performed by using the negative photoresist material, the photoresist material corresponding to the transparent region 42 is completely exposed, resulting in cross-linkage of components in the photoresist material. Thereby, a first photoresist pattern 48 which is not apt to be dissolved and removed by a develop liquid is formed. By contrast, the photoresist material corresponding to the semi-transparent region 44 is partially exposed, giving rise to partial cross-linkage of the components in the photoresist material. Thereby, a second photoresist pattern 46 in which the components having the partial cross-linkage are not apt to be dissolved and removed by the develop liquid is formed. On the contrary, as the patterning process is implemented with use of the positive photoresist material, it is necessary to replace the transparent region 42 with the non-transparent region, such that the photoresist material corresponding to the non-transparent region is not exposed. As such, the components in the photoresist material are not dissociated or ionized, bringing about no generation of photoacid. On said conditions, the first photoresist pattern 48 not apt to be dissolved or removed by the develop liquid is formed. By contrast, the photoresist material corresponding to the semi-transparent region 44 is partially exposed, giving rise to a partial dissociation or ionization of the components in the photoresist material and a formation of the photoacid. Thereby, the second photoresist pattern 46 is formed. Here, the second photoresist pattern 46 is apt to be dissolved and removed by the develop liquid because of the partial dissociation or ionization of the components in the photoresist material and the formation of the photoacid.

Upon conducting an actual measurement, the height $h_{sp1}$ of the first photoresist pattern 48 is substantially equal to 3.83 µm, for example, while the height $h_{sp2}$ of the second photoresist pattern 46 is substantially equal to 3.37 µm, for example. The difference between the height of the first photoresist pattern 48 and the height of the second photoresist pattern 46 is substantially equal to 0.46 µm. Namely, in the present embodiment, only one patterning process is required for forming the photoresist patterns with different heights as illustrated in FIG. 4B. Note that said heights and said difference are given as one of the embodiments of the present invention rather than as the limitation to the present invention. In other embodiments, the height of the first photoresist pattern 48 and the height of the second photoresist pattern 46 may have different values when other exposure dosages are provided or when the semi-transparent mask having different transmittance is employed. Certainly, the distribution and the outlines of the first photoresist pattern 48 and the second photoresist pattern 46 also vary upon the distribution of the regions in the semi-transparent mask 400. Likewise, through a utilization of the semi-transparent mask 400, only one patterning process is required for forming the first photo spacers 314 and the second photo spacers 316 according to a preferred embodiment of the present invention. The first photo spacers 314 and the second photo spacers 316 of the present invention can also be constructed by implementing a plurality of the patterning processes with use of a normal mask, which otherwise requires plenty of manufacturing time and costs.

Figure 5:
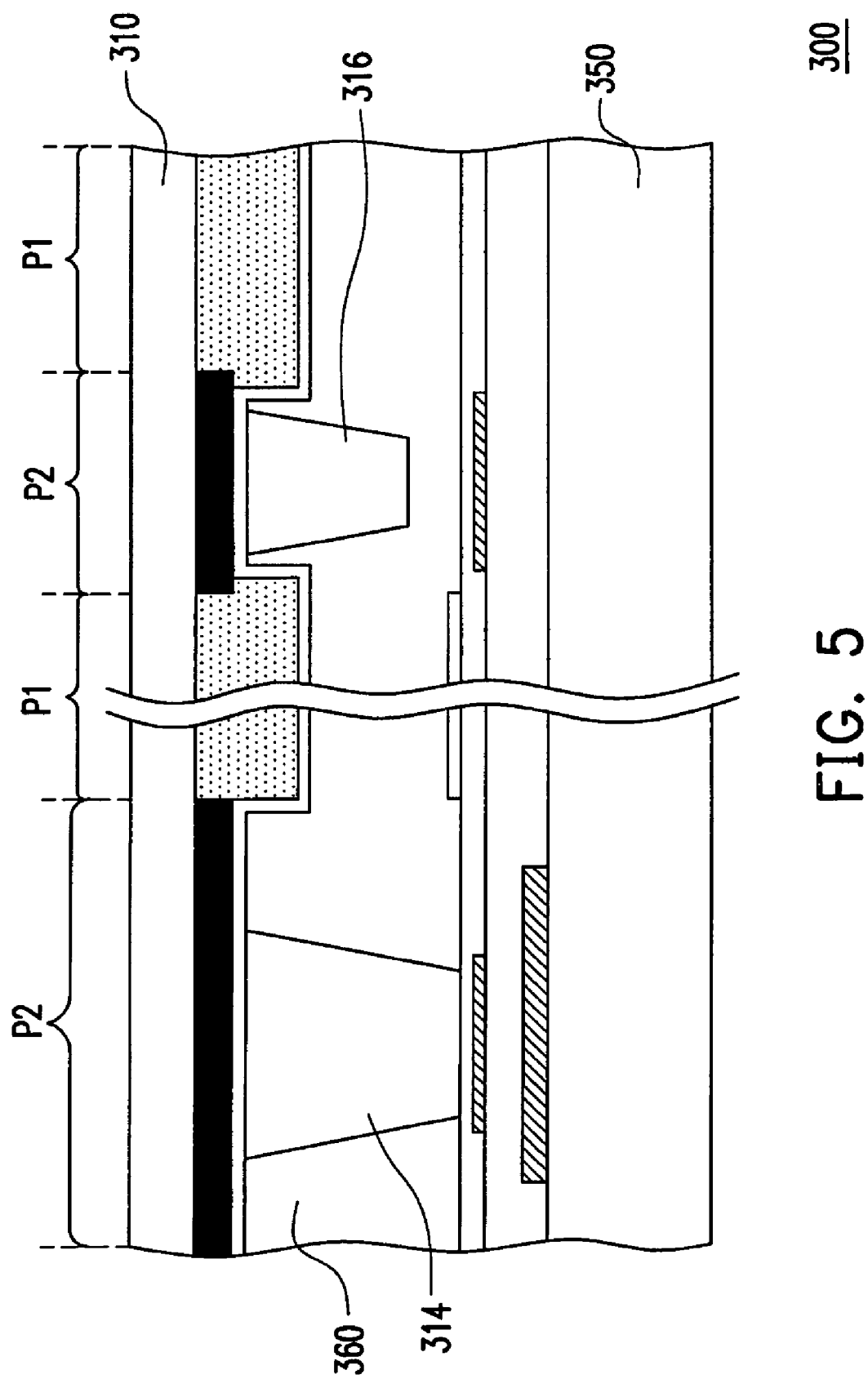
FIG. 5 is a schematic view illustrating the fabrication of the LCD panel by using the first substrate depicted in FIG. 3C.

FIG. 5 is a schematic view illustrating the fabrication of the LCD panel by using the first substrate depicted in FIG. 3C. Referring to FIG. 5, a second substrate 350 is provided, and an LC layer 360 is then constructed between the first substrate 310 and the second substrate 350. As such, the first substrate 310, the second substrate 350, and the LC layer 360 together form an LCD panel 300. In the present embodiment, the LC layer 360 is formed by performing a vacuum suction method or a one drop filling (ODF) method. In addition, a sealant (not shown) may be formed between the first substrate 310 and the second substrate 350, so as to seal the LC layer 360.

In the vacuum suction method, the pressure between the first substrate 310 and the second substrate 350 is less than an external pressure, such that the LC molecules are filled into the LCD panel 300 by means of the external pressure. In comparison, through the implementation of the ODF method, the LC molecules are dropped and filled onto the sealant-containing (not shown) first substrate 310 or the sealant-containing (not shown) second substrate 350 before the first and the second substrates 310 and 350 are assembled. After that, the first substrate 310 and the second substrate 350 are adhered to each other by means of the sealant (not shown).

In the present embodiment, the first photo spacers 314 disposed on the first substrate 310 are in contact with the second substrate 350, so as to maintain the distance between the first and the second substrates 310 and 350. However, the relatively short second photo spacers 316 do not contact the second substrate 350, and a predetermined distance is preserved among the second photo spacers 316. Thereby, as the vacuum suction method is carried out, sufficient spaces among the second photo spacers 316 and between the second photo spacers 316 and the second substrate 350 permit the LC molecules to flow therebetween. As a result, the LC molecules are evenly distributed between the first substrate 310 and the second substrate 350. Similarly, after the ODF method is performed, the LC molecules are also of great mobility when the first substrate 310 is adhered to the second substrate 350. Therefore, the disposition of the second photo spacers 316 of the present embodiment does not affect the mobility of the LC molecules, ensuring favorable quality of the LCD panel 300.

Note that the distribution and the dimensions of the first photo spacers 314 and the second photo spacers 316 in the LCD panel 300 can be similar to those of the LCD panel 200, while said distribution and said dimensions are not limited in the present invention. Accordingly, the disposition of the second photo spacers 316 in the LCD panel 300 is able to minimize the amount of the required LC materials, removing the cost barriers of manufacturing the LCD panel 300. In addition, at least one of the first photo spacers and the second photo spacers provided in the previous embodiments of the present invention which are projected on the first substrate has the substantially rectangular shape, while the substantially shape of the photo spacers is not limited in the present invention. Alternatively, each of the photo spacers may be shaped as a substantial polygon, a substantial triangle, a substantial quadrangle, a substantial rhombus, an substantial ellipse, a substantial circle, a substantial trapezoid, a substantial pentagon, a substantial hexagon, a substantial star, a substantial flower, and so forth.

Moreover, in the previous embodiments of the present invention, the first and the second photo spacers are formed by performing the exposure and development process, which is not limited in the present invention. Namely, the inkjet process and a screen printing process may also be implemented without using the photomask. In addition, according to the previous embodiments of the present invention, the first photo spacers, the second photo spacers, and the color filter films are disposed on the first substrate, which is not limited in the present invention. Namely, the color filter films can be disposed on the second substrate and located above/below the active layer, and the first and the second photo spacers can be disposed on at least one of the first substrate and the second substrate. Furthermore, in the previous embodiments of the present invention, the first photo spacers correspond to the scan lines of the non-display region and the second photo spacers correspond to the data lines of the non-display region, which is not limited in the present invention. The first and the second photo spacers can correspond to any location on the non-display region as long as the disposition of the first and the second photo spacers is in compliance with the principles discussed in the present invention. Namely, the first and the second photo spacers may simultaneously correspond to the scan lines on the non-display region or correspond to the data lines on the non-display region. In an alternative, the first photo spacers may correspond to the data lines and the scan lines on the non-display region, while the second photo spacers correspond to the scan lines and/or the data lines on the non-display region. It is also likely for the first photo spacers to correspond to the scan lines and/or the data lines on the non-display region, while the second photo spacers correspond to the scan lines and the data lines on the non-display region or correspond to any other locations on the non-display region. In other embodiment, the first photo spacers may corresponding to the active device (not shown) of the active layer in which the active device having first metal layer and second metal layer, while the second photo spacers may be corresponding to at least one of the data line and scan line, and sometime very small portion of the second photo spacers may be selectively corresponding to the active device or not corresponding to the active device.

Figure 6:
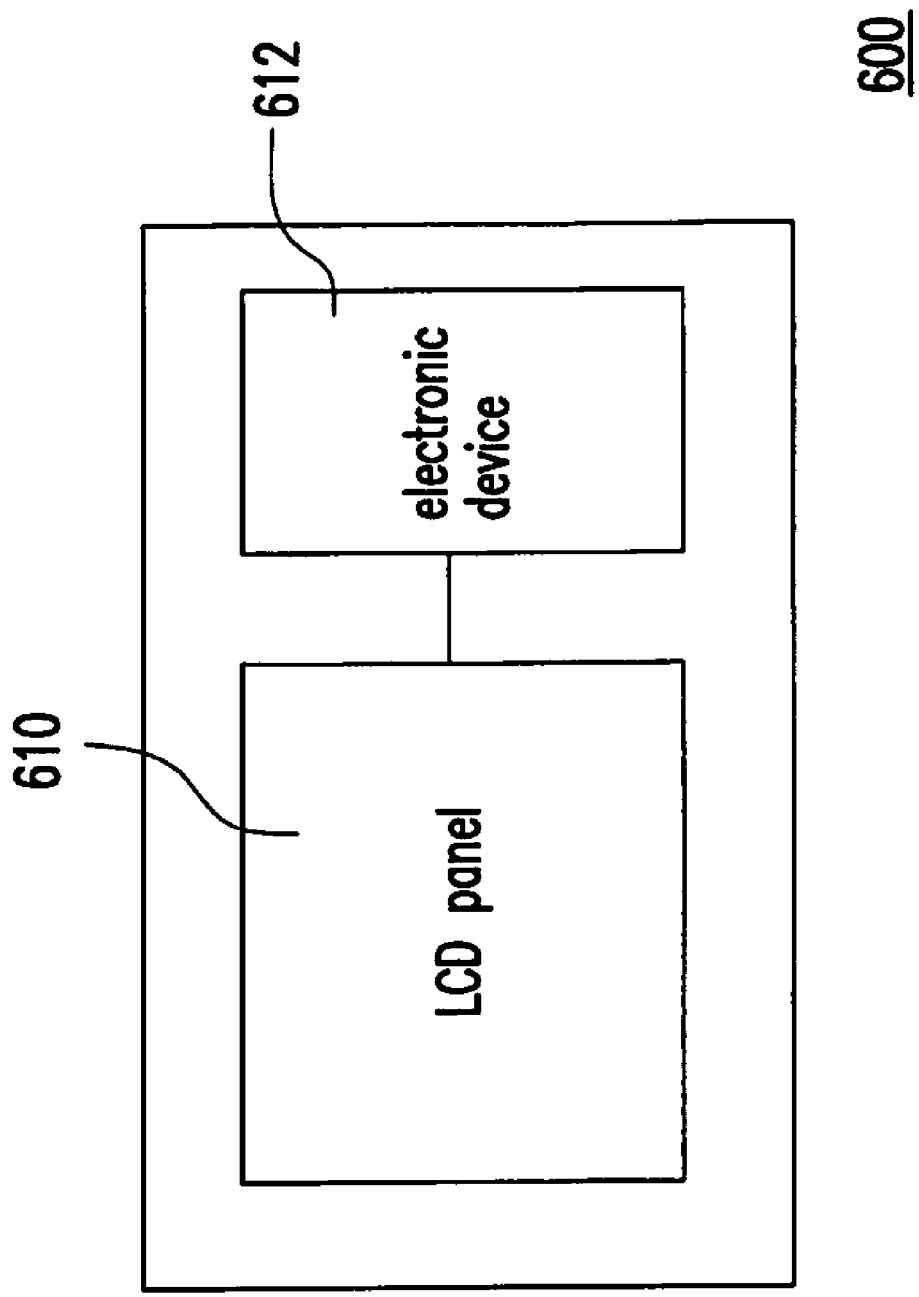
FIG. 6 is a schematic view of an electro-optical device according to an embodiment of the present invention.

FIG. 6 is a schematic view of an electro-optical device according to an embodiment of the present invention. Referring to FIG. 6, an electro-optical device includes an LCD panel 610 and an electronic device 612 electrically connected to the LCD panel 610. The LCD panel 610 can be the abovementioned LCD panel 200, the LCD panel 300, or any other LCD panels designed upon similar principles provided by the aforesaid embodiments. Since fewer LC materials are required by the LCD panel 610, the manufacturing costs of the electro-optical device 600 are rather low.

Classified by different displaying modes and designs of film layers, the LCD panel 610 includes a transmissive display panel, a transflective display panel, a reflective display panel, a color-filter-on-array display panel, an array-on-color-filter display panel, a vertical alignment (VA) display panel, an in plane switch (IPS) display panel, a multi-domain vertical alignment (MVA) display panel, a twist nematic (TN) display panel, a super twist nematic (STN) display panel, a pattern vertical alignment (PVA) display panel, a super-pattern vertical alignment (S-PVA) display panel, an advanced super view (ASV) display panel, a fringe-field switching (FFS) display panel, a continuous pinwheel alignment (CPA) display panel, an axially symmetric aligned microcell (ASM) display panel, an optically compensated bend (OCB) display panel, a super-in plane switch (S-IPS) display panel, an advanced super-in plane switch (AS-IPS) display panel, an ultra fringe-field switching (UFFS) display panel, a polymer sustained alignment (PSA) display panel, a dual-view display panel, a triple-view display panel, a three-dimensional display panel, any other display panels, or a combination thereof.

On the other hand, the electronic device 612 includes a control device, an operating device, a treatment device, an input device, a memory device, a driving device, a light emitting device, a protection device, a sensing device, a detecting device, other devices having other functions, or a combination thereof. In light of the above, the optoelectronic device 600 comprises a portable product (e.g. a mobile phone, a camcorder, a camera, a laptop computer, a game player, a watch, a music player, an e-mail receiver and sender, a map navigator, a digital picture, or the like), an audio-video product (e.g. an audio-video player or the like), a screen, a television, a bulletin, a panel in a projector, and so on.

To sum up, the LCD panel of present invention has at least the following advantages. First, the disposition of the second photo spacers gives rise to a reduction of the required LC materials, so as to minimize the manufacturing costs of the LCD panel. Furthermore, the height and the distribution of the second photo spacers ensure desirable mobility of the LC molecules. Thus, the LCD panel of the present invention is characterized by favorable quality. Additionally, in comparison with an original embodiment of the present invention, the semi-transparent photomask is used in the manufacturing method of the LCD panel according to another embodiment of the present invention. Thereby, the photo spacers having different dimensions can be formed. As such, cost barriers of the LCD panel can be removed, and the manufacturing processes of the LCD panel can be simplified as well.

Although the present invention has been disclosed above by the embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A liquid crystal display (LCD) panel, comprising:
a first substrate;
a second substrate substantially paralleled with the first substrate;
a black matrix disposed on the first substrate, surrounding a plurality of display regions, and defining a non-display region;
a liquid crystal layer disposed between the first substrate and the second substrate;
a plurality of first photo spacers disposed on the black matrix and contacting the second substrate; and
a plurality of second photo spacers disposed on the black matrix, so as to form a plurality of channels being formed between the second photo spacers, such that liquid crystal molecules of the liquid crystal layer flow between the display regions through the channels, wherein the width of the channels between any two of the adjacent second photo spacers substantially ranges from 2 μm to 10 μm, and the dimension of the first photo spacers is substantially greater than the dimension of the second photo spacers.

2. The LCD panel of claim 1, wherein the length of the second photo spacers in an extending direction of each of the channels substantially ranges from 2 μm to 19 μm.

3. The LCD panel of claim 1, wherein the width of the second photo spacers between any two of the adjacent channels substantially ranges from 2 μm to 19 μm.

4. The LCD panel of claim 1, wherein the length of the second photo spacers in an extending direction of each of the channels is substantially equal to 7 μm.

5. The LCD panel of claim 1, wherein the width of the second photo spacers between any two of the adjacent channels is substantially equal to 2 μm.

6. The LCD panel of claim 1, wherein a shape of each of the first photo spacers is projected on the first substrate is a substantially rectangular shape.

7. The LCD panel of claim 6, wherein the width of the substantially rectangular shapes substantially ranges from 8 µm to 24 µm, and the length of the substantially rectangular shapes substantially ranges from 8 µm to 24 µm.

8. The LCD panel of claim 6, wherein the width of the substantially rectangular shapes substantially ranges from 8 µm to 16 µm, while the length of the substantially rectangular shapes substantially ranges from 17 µm to 24 µm.

9. The LCD panel of claim 1, wherein a difference between the height of the first photo spacers and the height of the second photo spacers is substantially greater than 0 µm but substantially less than or substantially equal to 3 µm.

10. The LCD panel of claim 1, further comprising an active layer disposed on the second substrate, the active layer comprising a plurality of thin film transistors, a plurality of scan lines disposed in the non-display region, and a plurality of data lines disposed in the non-display region, wherein the scan lines interlace with the data lines, and the thin film transistors are electrically connected to the corresponding scan lines and data lines.

11. The LCD panel of claim 1, further comprising a plurality of color filter films disposed on the first substrate and located in the display regions.

12. A method of manufacturing a liquid crystal display (LCD) panel, the method comprising:
providing a first substrate having a plurality of display regions and a non-display region;
forming a black matrix on the non-display region of the first substrate, wherein the black matrix surrounds the display regions;
forming a photoresist material layer on the first substrate;
performing a patterning process to pattern the photoresist material layer, such that a plurality of first photo spacers and a plurality of second photo spacers are formed on the black matrix, so as to form a plurality of channels being formed between the second photo spacers, wherein the dimension of the first photo spacers is substantially greater than the dimension of the second photo spacers, and the width of the channels between any two of the adjacent second photo spacers substantially ranges from 2 µm to 10 µm;
providing a second substrate on the first substrate; and
forming a liquid crystal layer between the first substrate and the second substrate, wherein liquid crystal molecules of the liquid crystal layer flow between the channels, and the first photo spacers contact the second substrate.

13. The method of claim 12, further comprising forming a plurality of color filter films on the first substrate and in the display regions.

14. The method of claim 12, further comprising forming an active layer on the second substrate, the active layer comprising a plurality of thin film transistors, a plurality of scan lines disposed in the non-display region, and a plurality of data lines disposed in the non-display region, wherein the scan lines interlace with the data lines, and the thin film transistors are electrically connected to the corresponding scan lines and data lines.

15. The method of claim 12, wherein a semi-transparent photomask is utilized for performing the patterning process.

16. The method of claim 12, wherein the formation of the liquid crystal layer comprises a vacuum suction method.

17. The method of claim 12, wherein the formation of the liquid crystal layer comprises a one drop filling method.

18. An electro-optical device, comprising the liquid crystal display panel of claim 1.

19. A method of manufacturing an electro-optical device, comprising the method of manufacturing the liquid crystal display panel of claim 12.

20. A liquid crystal display (LCD) panel, comprising:
a first substrate;
a second substrate substantially parallel with the first substrate;
a black matrix disposed on the first substrate, and defining a non-display region, wherein the black matrix is constituted of a plurality of longitude lines and a plurality of latitude lines, and the longitude lines are substantially perpendicular with the latitude lines;
a plurality of first photo spacers disposed on the black matrix and contacting the second substrate, wherein the first photo spacers are distributed on the latitude lines of the black matrix; and
a plurality of second photo spacers disposed on the black matrix, wherein the second photo spacers are distributed on the longitude lines of the black matrix, wherein the first photo spacers are dimensionally different from the second photo spacers.

* * * * *